United States Patent Office 3,248,298
Patented Apr. 26, 1966

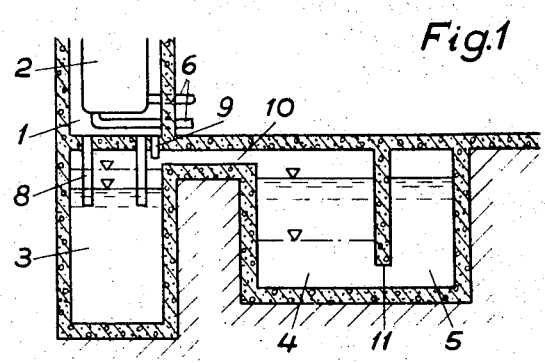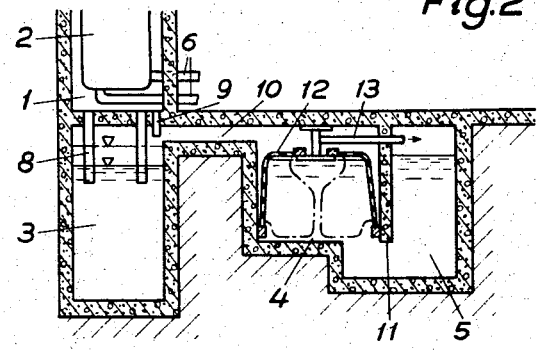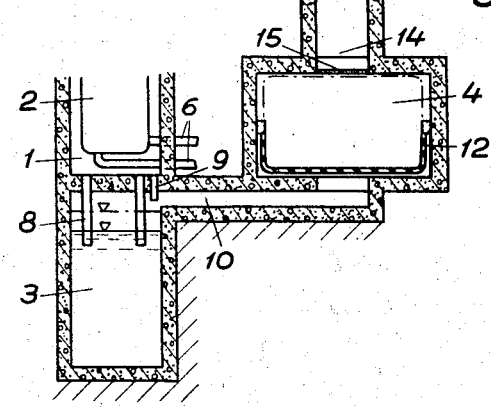

3,248,298
PRESSURE-ABSORBING MEANS FOR NUCLEAR REACTOR STATIONS
Hans Norman, Vasteras, Sweden, assignor to Allmanna Svenska Elektriska Aktiebolaget, Vasteras, Sweden, a corporation of Sweden
Filed Jan. 20, 1964, Ser. No. 338,734
Claims priority, application Sweden, Jan. 24, 1963, 771/63
7 Claims. (Cl. 176—37)

In general in nuclear reactor stations the reactor itself and its auxiliary system are situated in one chamber, while the turbine plant with its auxiliary system are situated in a separate chamber.

For reasons of security it is required that the reactor building and plant shall be made so that the reactor building is able to withstand the overpressure which arises in the building upon a reactor breakdown, i.e. if rupture should occur in the reactor shell or any of the large tube conduits which lead from the reactor to the turbine plant. The reactor contains a relatively large amount of water acting as cooling water or also moderator, for example heavy water, which during operation has a high temperature. Upon a reactor breakdown the water will flow out and steam is formed which causes over-pressure in the reactor building. This should therefore be made and dimensioned so that it withstands and seals the over-pressure of for example 2 atm. overpressure which is formed if all the coolant in the reactor flows out.

As a result of these requirements, a system has an increasing extent been adopted, in which the pressure which originates from the water vapourizing in the reactor chamber upon a reactor breakdown is taken up by a partly water-filled, isolated chamber with radiation protection. This system is known by the name "pressure-suppression system" and the above-named chamber will in the following be called PS chamber. In such arrangements exhaust conduits are inserted in the bottom of the reactor chamber which run out under the water level in the PS-chamber. The large tube conduits from the reactor to the turbine chamber are provided in the reactor chamber with quick-closing valves, which upon rupture outside the reactor chamber on any of the large tube conduits may with the help of a control equipment be quickly closed. If the rupture occurs in the reactor or between the reactor and the valves the flowing steam is led down into the water in the PS-chamber where it condenses. The large chambers which lie outside the reactor chamber may in this way be dimensioned for a considerably lower pressure than previously, hence the expression "pressure suppression." The reactor chamber may thus be dimensioned for an over-pressure ca. 2–5 atm, whereas in dimensioning of the rest of the station no pressure increase need be taken into consideration. Previously it was necessary that a large gas-tightly enclosed part of the reactor plant could resist an over-pressure of ca. 2 atm., which considerably increased the construction costs.

The hitherto known PS-system has however the drawback that the PS-chamber itself is closed and must be dimensioned for the air volume which in normal condition is present over the water level as well as for the air volume present in the reactor chamber, which upon rupture is carried away by the steam flowing out to the PS-chamber. The problem therefore arises of balancing the volume and pressure conditions in the PS-chamber in such a way that on the one hand the chamber is not too big and on the other hand the pressure does not rise too high. In addition it is also necessary that the present air which is contaminated upon a rupture shall also be isolated.

The present invention gives a simple and effective solution to said problems. The characteristic of the invention is that the PS-chamber, i.e. the partly water-filled tank, is put by an isolating arrangement in communication with at least one chamber, which in its turn is put by a channel in communication with the open air. As isolating arrangement either a water lock or a membrane may be used.

The invention will be described with the aid of three embodiments which are shown schematically in FIGURES 1, 2 and 3 on the accompanying drawing.

In the figures 1 indicates the reactor chamber which contains the reactor 2, 3 is the so-called PS-chamber, 4 is a buffer-chamber and 5 a channel which is in communication with the open air. 6 indicates the large tube-conduits which lead to the turbine plant. Through the bottom of the reactor chamber exhaust conduits 8 are driven which run out under the water level in the PS-chamber 3. A tube socket 9 with a non-return valve in the reactor bottom is intended to return the exhausted air volume to the reactor chamber after an exhaust. A communicating channel 10 between the PS-chamber 3 and the buffer chamber 4 is also common to all the embodiments.

The water level in normal condition is indicated in the PS-chamber 3 by an unbroken line and the water level after blowing out by a dotted line.

According to FIGURE 1 the buffer-chamber 3 is separated from a cooling water channel 5 by a water lock 11. The water may expand into the channel. Through the shown embodiment shown it is possible to limit the volume which is otherwise necessary for the PS-system to about 30%. If for reasons of security this solution is not allowable the expansion may occur either to the fuel element tank which is always present, to a separate tank or to possibly available sedimentation tanks. With such an alternative however a volume increase of the buffer-tank is obtained dependent on the increase in level in the secondary tank.

One way of avoiding said volume increase is to isolate the exhausted volume of air from the water by means of a membrane 12, as shown in FIGURE 2. The membrane 12 is in this construction attached in the bottom part of the buffer tank 4 and limits on the secondary side a volume of water which at upon reactor breakdown forces its way more or less into the cooling water channel 5. For a presumed pressure condition in the PS-system the size of the buffer-chamber 4 may in this way be reduced by a volume which corresponds to the volume of air in the buffer chamber under atmospheric pressure recalculated for the over-pressure in question. 13 is a ventilation tube.

FIGURE 3 shows an alternative, where air is used instead of water on the secondary side of the membrane. Such a construction should allow a quicker progress considering the acceleration of the secondary side. The membrane is however in this case in the end position pressure-absorbing at the exhaust opening 15 to the open air. As a safety measure a protective grid 14 may be arranged in the exhaust opening 15.

A further alternative is feasible where the air volume over the water level of the PS-tank is kept under pressure at normal conditions.

I claim:
1. A nuclear reactor plant comprising means forming a pressure-resistant reactor chamber, a reactor situated in said reactor chamber, and means for taking up pressure medium released in said chamber upon reactor breakdown, said means including a tank filled with water up to a certain level, conduit means for leading said pressure medium from said reactor chamber into said tank at a point below said water level, said tank having an air space therein above water level, means forming a passageway from said air space to open air, said passageway forming means including means forming a second chamber adjacent the tank and having a part communicating with said air space so that air can flow from said air space into such part of the tank, and means in such passageway to pre- vent escape of air from said part of the second chamber to the free air.

2. In a reactor plant as claimed in claim 1, said air space communicating with said second chamber at a point substantially higher than the bottom thereof, and said air escape preventing means comprising a body of liquid in said second chamber forming a liquid lock.

3. In a reactor plant as claimed in claim 2, means in said second chamber preventing contact between said air and the body of liquid.

4. In a reactor plant as claimed in claim 1, said escape preventing means comprising a displaceable membrane secured across said second chamber and engageable on one side by said air.

5. In a reactor plant as claimed in claim 1, said air space communicating with said second chamber at a point substantially higher than the bottom thereof, said second chamber having a body of liquid therein below the air, and means connecting the second chamber at a point below the liquid therein to free air, said last connecting means extending upwardly above the top of the liquid in the second chamber, said liquid in the second chamber constituting at least in part said escape preventing means.

6. In a reactor plant as claimed in claim 5, a displaceable membrane secured across said second chamber above the liquid therein.

7. In a reactor plant as claimed in claim 1, said escape preventing means comprising a displaceable membrane secured across said second chamber and engageable on one side by said air, said second chamber having an air space therein on the opposite side of the membrane from said air, and having a passage leading out of such opposite side to the open air, and a grid at the entrance to such passage.

References Cited by the Examiner

UNITED STATES PATENTS

| 3,056,736 | 10/1962 | Went et al. | 176—37 |
| 3,115,450 | 12/1963 | Schanz | 176—38 |

FOREIGN PATENTS 862,624  3/1961  Great Britain.

OTHER REFERENCES

Chemical and Engineering News, vol. 39, No. 28, July 10, 1961, pages 21 and 22.

LEON D. ROSDOL, *Primary Examiner.*

L. DEWAYNE RUTLEDGE, CARL D. QUARFORTH, *Examiners.*

J. V. MAY, *Assistant Examiner.*